Oct. 27, 1959  G. A. FRANCIS  2,909,950
ASSEMBLING AND SECURING APPARATUS
Filed Jan. 17, 1957  5 Sheets-Sheet 1
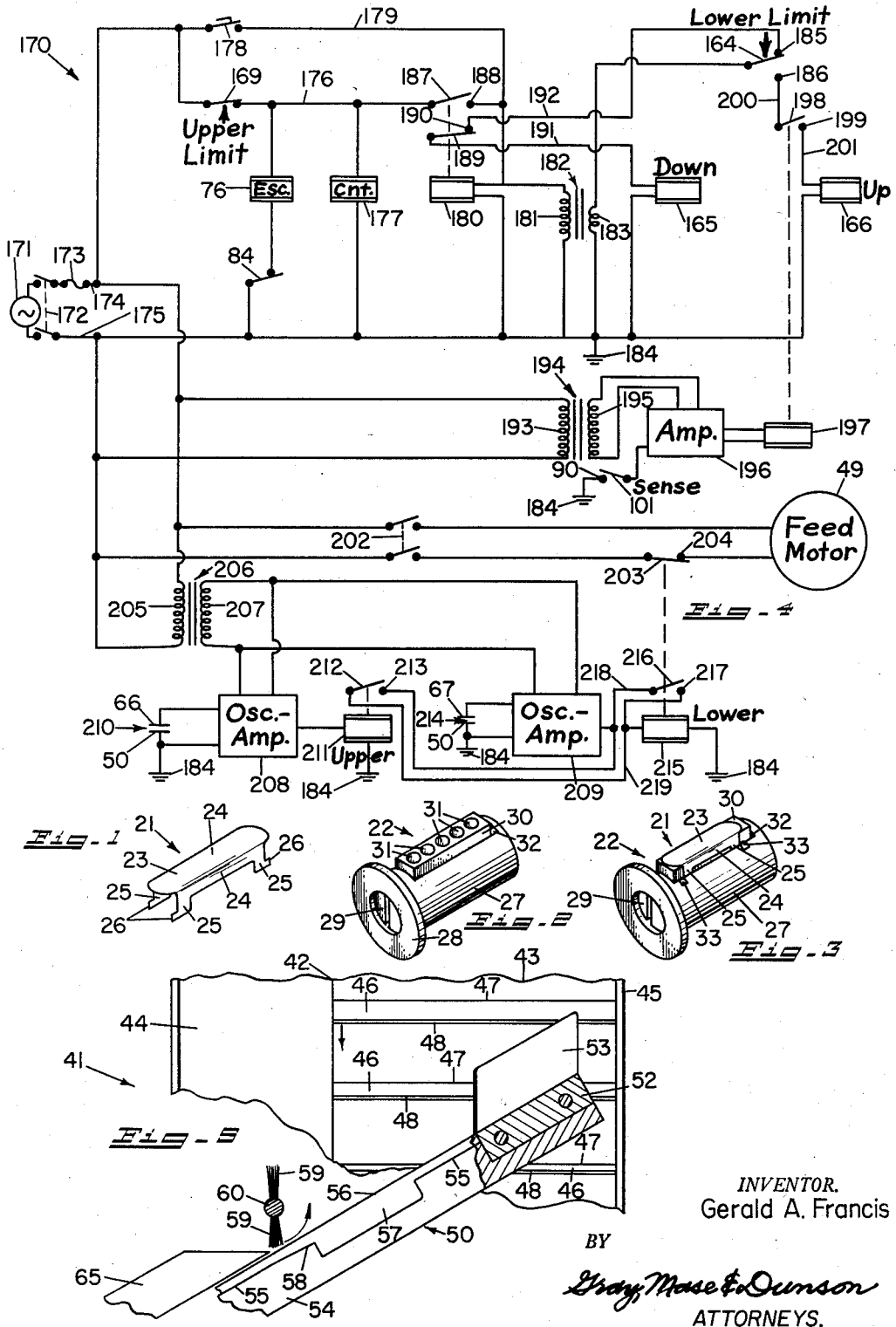
INVENTOR.
Gerald A. Francis
BY
Gray, Mase & Dunson
ATTORNEYS.

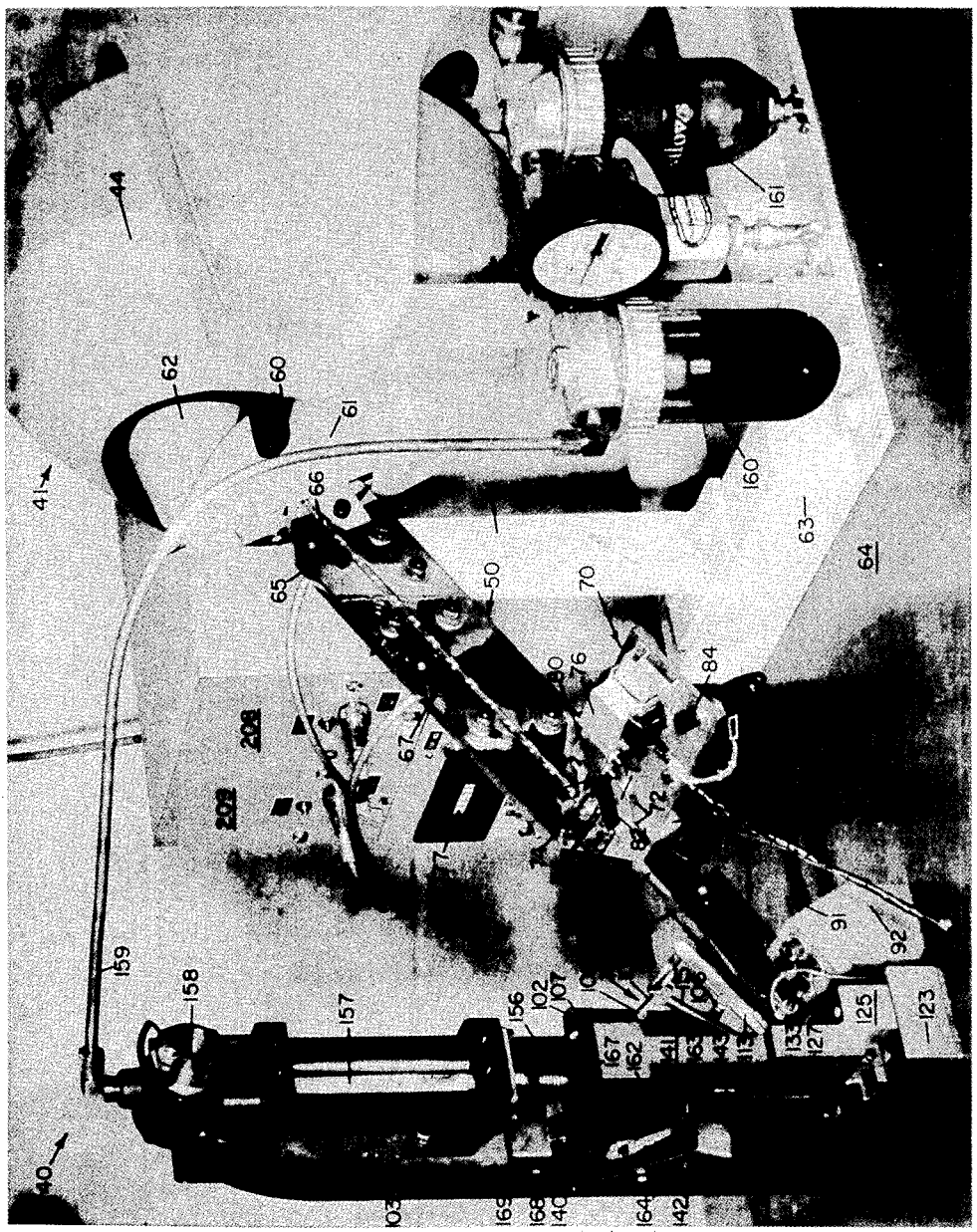

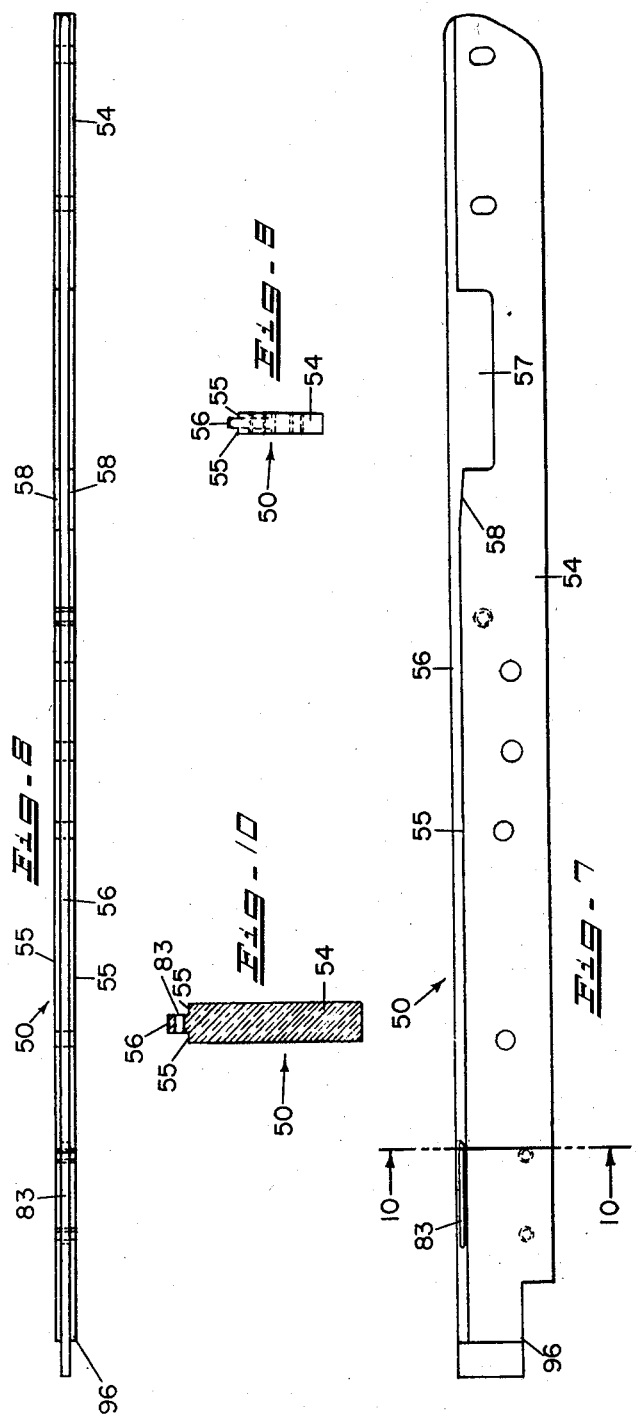

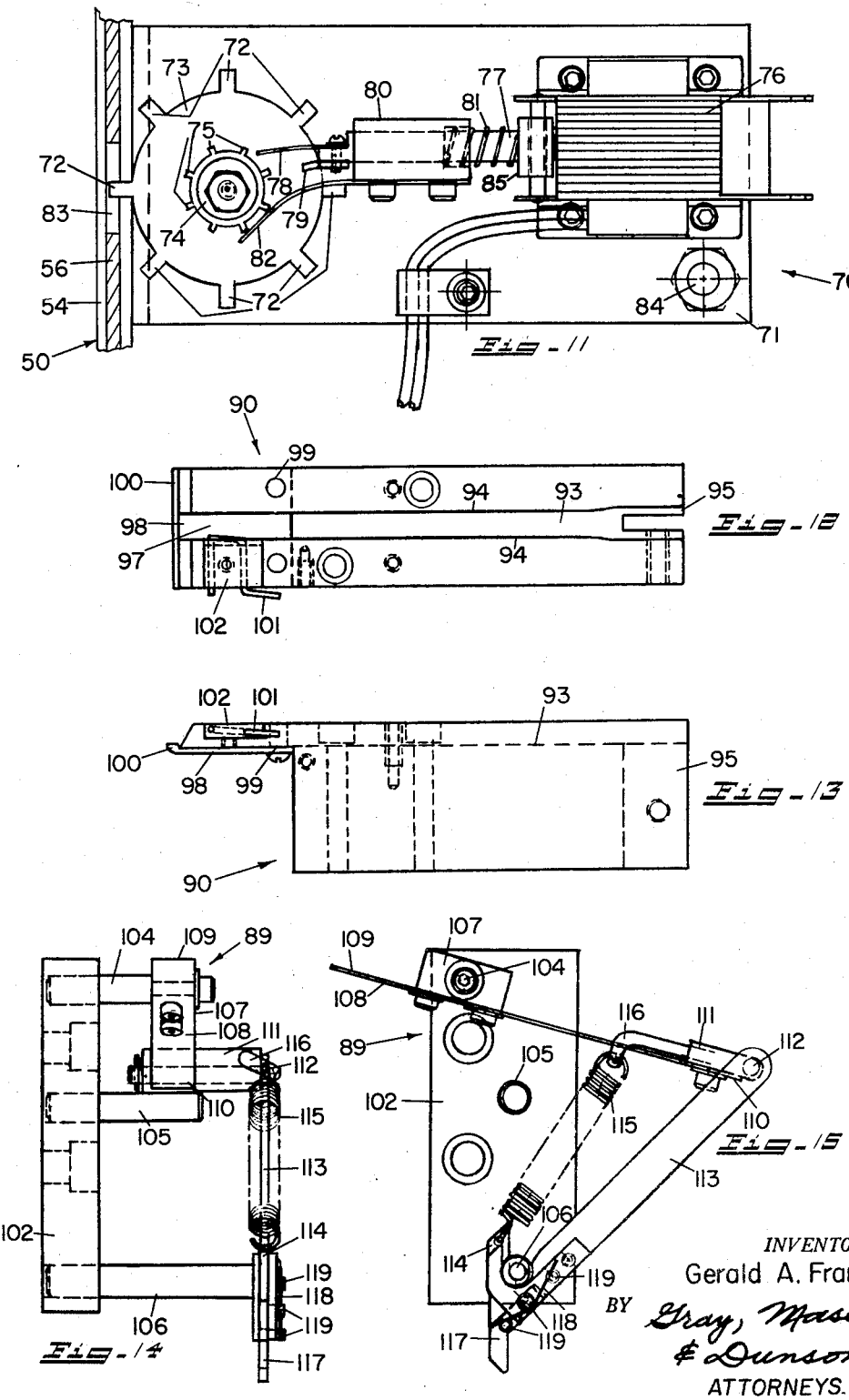

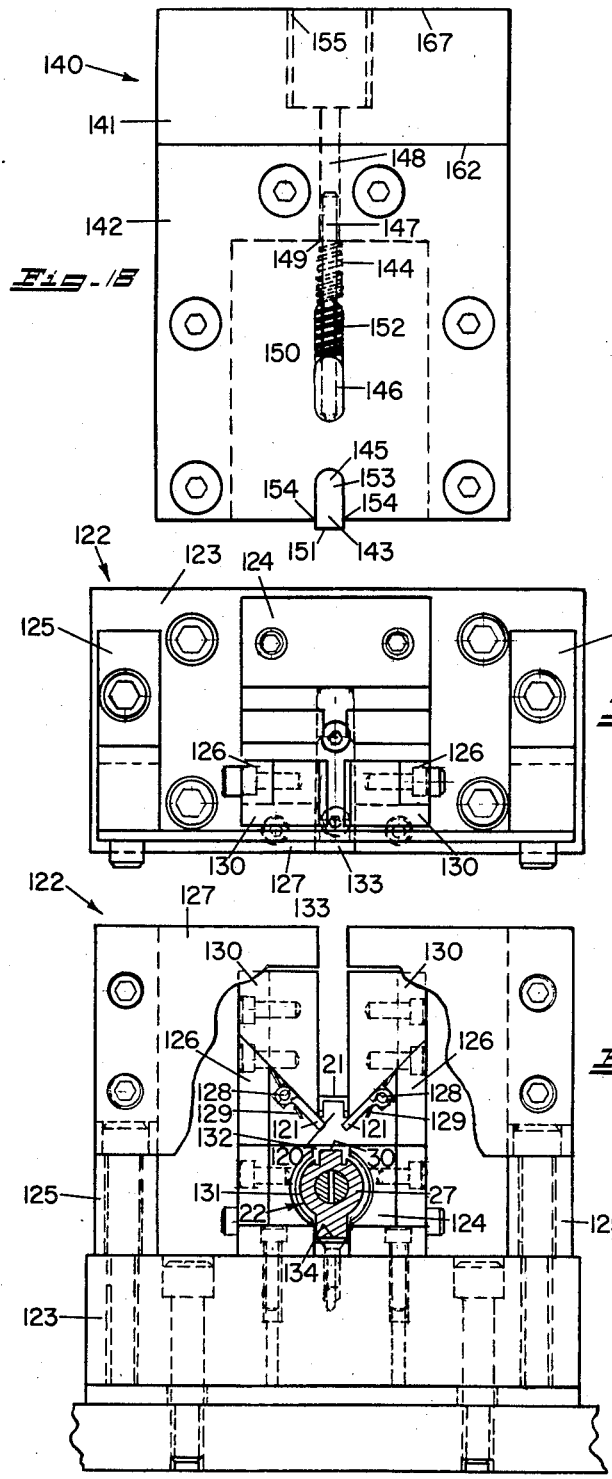

2,909,950
ASSEMBLING AND SECURING APPARATUS

Gerald A. Francis, Columbus, Ohio, assignor, by mesne assignments, to Hurd Lock and Manufacturing Company, Detroit, Mich., a corporation of Michigan Application January 17, 1957, Serial No. 634,790

12 Claims. (Cl. 78—1)

This invention relates to assembling and securing apparatus. It has to do particularly with apparatus for feeding singly to a predetermined receiving location a plurality of substantially identical channel members and for fastening each channel member to a receiving member at least partially surrounding the channel member at the receiving location.

A preferred form of assembling and securing apparatus, according to the present invention, which is illustrated and described herein, is particularly useful for placing seal plates on locks and fastening them to the locks. The preferred form of apparatus disclosed herein can be used conveniently with the assembly apparatus of the co-pending U.S. patent application of Gerald A. Francis et al., Serial No. 555,047, filed December 23, 1955. The assembly apparatus of that patent application assembles pins and springs, and places them in the proper pin chambers of pin-tumbler-type locks automatically, and successively, in accordance with a predetermined plan of mass production.

After the lock pins and springs have been placed in the pin chambers, it is necessary to place a cover or seal plate over the outer ends of the pin chambers and to fasten the seal plate to the lock body, in order to provide a surface against which the springs can press and to retain the pins and springs in their respective pin chambers. Heretofore it has been common to place the seal plate on the lock body manually and then fasten it in place by means of a swaging or staking punch.

The present invention provides completely automatic or semiautomatic performance of both of these and related functions, as desired; and eliminates all human handling of the seal plates, other than the placing of a quantity of them in a container or hopper. This invention provides the obvious advantages of faster, automatic, and more reliable production as well as other advantages that are apparent from the detailed disclosure herein.

Features of apparatus according to the present invention for feeding singly to a predetermined receiving location a plurality of substantially identical channel members and for fastening each channel member to a receiving member at least partially surrounding the channel member at the receiving location include: a container for the channel members; means for lifting and dropping the channel members in the container; means for intercepting some of the falling channel members and directing them toward a predetermined location; an inclined guide rail having its upper end at the predetermined location for catching some of the channel members dropping thereon that are longitudinally oriented substantially in the direction of the rail and for permitting the channel members to slide longitudinally in tandem down the guide rail and out of the container; means in the container adjacent to the guide rail for removing from the rail any channel member thereon that extends beyond a predetermined region; upper and lower detecting means adjacent to the guide rail at upper and lower detecting positions, respectively, on the rail, for detecting the presence of any channel member at each detecting position; means, responsive to the detecting means, for starting the operation of the lifting and dropping means in the absence of any channel member at the lower detecting position, for continuing the operation of the lifting and dropping means in the absence of any channel member at the upper detecting position, and for stopping the operation of the lifting and dropping means upon the presence of a channel member at the upper detecting position; an escapement mechanism, at a holding location on the rail below the detecting positions, for releasing and propelling one channel member at a time, comprising a rotatable member having radially projecting pins angularly equally spaced thereon and means for rotating the rotatable member at a predetermined stage of operation through an angle equal to the angle between successive projecting pins to move one projecting pin from the holding location and propel one channel member downward from the holding location while moving the next projecting pin to the holding location to retain the next channel member at the holding location; an inclined guide chute, having its upper end communicating with the lower end of the guide rail, for receiving each channel member propelled downward by the escapement mechanism and for permitting the channel member to slide longitudinally down on the bottom surface of the chute to a stopping position therein including a surface projecting above the adjacent bottom surface; sensing means at the stopping position for detecting the presence of any channel member at the stopping position; means for positioning a receiving member in place at the receiving location; yieldable means for supporting a channel member at an awaiting position adjacent to the receiving location; reciprocable pressing and fastening means comprising a yieldable pressing member positioned to press the channel member from the awaiting position to the receiving location during a power stroke of the pressing and fastening means, and a fastening member positioned to strike the receiving member at the end of the power stroke to swage a portion of the receiving member adjacent to the channel member to fasten the channel member to the receiving member; reciprocable drive means for driving the pressing and fastening means alternately in a power stroke from a return position spaced from the receiving position to a fastening position in contact with the receiving member, and in a return stroke from the fastening position to the return position; means, responsive to the sensing means, for interrupting the reciprocal movement of the drive means before its return stroke in the absence of any channel member at the stopping position and for providing the return stroke upon the presence of a channel member at the stopping position; and means, responsive to the position of the pressing and fastening means, for propelling the channel member, during the return stroke, from the stopping position to the awaiting position, ready to be pressed to the receiving location and fastened to the receiving member by the next power stroke of the pressing and fastening means.

In the drawings:

Fig. 1 is a perspective view of a typical seal plate, one of the members that is assembled and secured by the apparatus of the present invention;

Fig. 2 is a perspective view of a typical lock body, the member to which the seal plate of Fig. 1 is assembled and secured by the apparatus of this invention;

Fig. 3 is a perspective view of the seal plate of Fig. 1 and the lock body of Fig. 2, as assembled and secured by the apparatus of the present invention;

Fig. 4 is a schematic diagram of the electrical control system of an assembling and securing apparatus according to the present invention;

Fig. 5 is a side view, partially in section, and with some parts cut away, of a portion of a parts feeder used in the assembling and securing apparatus;

Fig. 6 is a perspective view of a preferred form of assembling and securing apparatus according to the present invention;

Figs. 7-19 are views of various components and subcombinations included in the assembling and securing apparatus of Fig. 6; specifically:

Fig. 7 is a side view of the conveyor magazine or guide rail;

Fig. 8 is a top view of the guide rail of Fig. 7;

Fig. 9 is an end view of the guide rail of Fig. 7;

Fig. 10 is an enlarged cross-sectional view taken on the plane 10—10 of Fig. 7;

Fig. 11 is a plan view, partially in section, of the escapement mechanism, and a portion of the adjacent guide rail;

Fig. 12 is a top view of the guide chute;

Fig. 13 is a side view of the guide chute;

Fig. 14 is a front view of the injector;

Fig. 15 is a side view of the injector;

Fig. 16 is a top view of the sealing assembly;

Fig. 17 is a front view, partially in section, and with parts cut away, of the sealing assembly, with a seal plate and a lock body held therein ready for assembling and securing;

Fig. 18 is a front view of the staking punch; and

Fig. 19 is a side view of the staking punch.

Seal plate 21 and lock body 22

The drawings illustrate a preferred form of assembling and securing apparatus according to the present invention, for use particularly for assembling and securing together a seal plate 21, as shown in Fig. 1, and a lock body 22, as shown in Fig. 2. The seal plate 21 is a thin channel member having a top 23, a pair of opposite sides 24—24, feet 25—25 at the opposite ends of each side 24, and projecting toes 26—26, one at the end of each foot 25.

The lock body 22 includes a cylindrical housing 27, a front plate 28, rotatable key plug 29, and a chamber block 30. Cylindrical pin chambers 31—31 are provided in the chamber block 30. Each pin chamber 31 contains a pin and a spring (not shown) which may have been placed in the chamber 31 in any convenient manner, as by hand or preferably by means of the assembly apparatus of the co-pending U.S. patent application, Serial No. 555,047, filed December 23, 1955, of Gerald A. Francis et al. A slot 32 is provided in the cylindrical housing 27 on each of the two long sides of the chamber block 30. In the views of Figs. 2 and 3, the right-hand slot 32 is the only one visible. The left-hand slot 32 is similarly located on the left side of the chamber block 30.

The seal plate 21 is shaped to fit snugly over the chamber block 30, and the slots 32 are made deep enough to accommodate the feet 25—25 of the seal plate 21 when the top 23 of the seal plate 21 is in contact with the top of the chamber block 30. The apparatus of Figs. 4-19 places the seal plate 21 in this position, as shown in Fig. 3, and fastens the seal plate 21 to the lock body 22 by an operation known as "staking," in which material indicated at 33—33 of the cylindrical housing 27 is swaged or "staked." The material 33—33 bridges portions of the slots 32—32 above the toes 26—26 of the seal plate 21, thereby fastening the seal plate 21 to the lock body 22. The assembled and fastened seal plate 21 and lock body 22 are shown in Fig. 3.

The purpose of the seal plate 21, of course, is to hold the pins and springs in the pin chambers 31—31 and provide a fixed surface against which the upper ends of the springs are pressed. The left side of the seal plate 21, not visible in Fig. 3, is held in place after the staking operation in the same manner as is the right side of the seal plate 21, as shown in Fig. 3.

Sealing machine 40, parts feeder 41

The assembly perspective view, Fig. 6, shows the assembling and securing apparatus which, for convenience, is referred to herein as the sealing machine 40. A parts feeder 41 comprises a container 42 having a cylindrical portion 43, a coaxial conical portion 4, and a back plate 45. (See also Fig. 5.) Longitudinal strips 46—46 are rigidly connected each along one edge as is indicated at 47—47 in Fig. 5 at equally spaced positions around the inside of the cylindrical portion 43 of the container 42. The opposite ends 48—48 of the strips 46—46 are spaced from the cylindrical portion 43, with the strips 46—46 each making an acute angle with the inner surface of the cylindrical portion 43 of the container 42. The container 42 is rotated counterclockwise by a feed motor 49 (see Fig. 4) about the axis of the container 42, which is tipped back slightly from the horizontal as shown in Fig. 6.

The parts feeder 41 is partially filled with seal plates 21—21. The longitudinal strips 46—46 serve as pockets or scoops with their inwardly projecting edges 48—48 leading in the direction of rotation. The strips 46—46 lift some of the seal plates 21—21 from the bottom of the container 42, during rotation thereof, to the top portion of the container 42 where they drop off the strips 46—46. A suitable parts feeder that provides the parts 42—48 is the Model 400-A Tumble Feeder, manufactured by The Feedall Corporation, Willoughby, Ohio.

Guide rail 50

An inclined conveyor magazine or guide rail 50 is mounted on a support 51, with the upper end 52 of the guide rail 50 in the upper rear region of the container 42, where the bulk of the seal plates 21—21 are dropped during rotation of the container 42. Symmetrically mounted on opposite sides of the guide rail 50 at its upper end 52 is a pair of guide collector plates 53—53, only one of which is shown in Fig. 5, for clarity. The guide collector plates 53—53 form a chute or trough for intercepting some of the falling seal plates 21—21 and directing them to the guide rail 50.

The guide rail 50 comprises a lower body portion 54, the upper surfaces 55—55 of which serve as supporting surfaces for the feet 25—25 of the seal plates 21—21, and an upwardly projecting guide portion 56 (see also Figs. 7-10).

Some of the seal plates 21—21 that fall on the guide-collector plates 53—53 and are directed thereby toward the guide rail 50 are oriented substantially in the direction of the guide rail 50. Some of them fall on the guide rail 50 and slide longitudinally in tandem down the guide rail 50. At the upper end 52 of the guide rail 50, the seal plates 21—21 slide on the supporting surfaces 55—55. As they proceed past a cutaway portion 57 of the lower body portion 54, the seal plates 21—21 are supported by the upwardly projecting guide 56. Upon reaching the inclined portion 58—58 of the support surfaces 55—55, each seal plate 21 is raised so that its top 23 clears the upwardly projecting guide 56 and continues to slide downward with its feet 25—25 resting on the support surfaces 55—55.

The usual stamping and shaping operations in the manufacture of the seal plate 21 are such that a burr might occasionally be present on the lower surface of the top 23, but seldom, if ever, on the lower surfaces of the feet 25—25. Supporting the seal plates 21—21 by their feet 25—25 on the supporting surfaces 55—55 makes it unnecessary to remove burrs from the lower surfaces of the tops 23—23 of the seal plates 21—21. Burrs could cause some of the seal plates 21—21 to slide at a higher level than others, with jamming as a possible result, if the seal plates 21—21 were supported by the upwardly projecting guide 56 so as to rest on their tops 23—23 rather than on their feet 25—25. Since the seal plates 21—21 slide on their feet 25—25, supported by the supporting surfaces 55—55, all of the seal plates 21—21 remain in line at the same level and cannot partially overlap or jam.

Jam-preventer brushes for those seal plates 21—21 not yet properly aligned are driven by a shaft 60 to rotate in a counterclockwise direction as viewed in Fig. 5. The feed motor 49 drives the shaft 60 through conventional gearing (not shown). The brushes 59—59 do not reach any seal plate 21—21 that is properly located on the guide rail 50; but if one is tipped or partially on another seal plate 21, part of it extends above the normal upper level of the top 23 and the brushes 59—59 sweep it away from the guide rail 50, causing it to drop back into the container 42. Thus, all of the seal plates 21—21 that slide past the jam-preventer brushes 59—59 are properly aligned and cannot jam as they continue to slide on the supporting surfaces 55—55 of the guide rail 50 and out of the container 42.

A fixed cover 61 mounted on the guide rail 50 and a removable cover 62 mounted on the fixed cover 61 cover most of the front opening in the parts feeder 41. The upper cover 62 is readily removed to provide an opening for supplying seal plates 21—21 to the parts feeder 41. The support member 51, the parts feeder 41, and associated components are mounted on a supporting frame 63, which is fixedly mounted on a supporting table 64.

A magazine guide or guide rail cover 65 is mounted on the guide rail 50, covering the guide rail 50 and the seal plates 21—21 thereon.

*Detector plates 66, 67*

An upper detector plate 66, mounted in the guide rail cover 65 parallel to the tops 23—23 of the seal plates 21—21 on the guide rail 50, is connected as one plate of a condenser 210, as shown in Fig. 4, the other plate of which is the grounded guide rail 50. When a seal plate 21 is present on the guide rail 50 adjacent to the detector plate 66, the capacitance between the plates 66, 50 is increased. Thus the plate 66 provides means for detecting the presence of a seal plate 21 at the upper detecting position adjacent to the plate 66.

A lower detector plate 67, mounted in the guide rail cover 65 parallel to the tops 23—23 of the seal plates 21—21 on the guide rail 50, is connected as one plate of a condenser 214, as shown in Fig. 4, the other plate of which is the grounded guide rail 50. When a seal plate 21 is present on the guide rail 50 adjacent to the detector plate 67, the capacitance between the plates 67, 50 is increased. Thus the plate 67 provides means for detecting the presence of a seal plate 21 at the lower detecting position adjacent to the plate 67.

*Escapement mechanism 70*

An escapement mechanism 70 is mounted on the guide rail 50 by means of an escapement mounting bracket 71. Radially projecting escapement pins 72—72 are angularly equally spaced around the periphery of an escapement disk 73 rotatably mounted on the bracket 71. Rigidly mounted coaxially on the escapement disk 73 is an actuating disk 74 having radially projecting actuating pins 75—75 equally spaced thereon at the same angle as the angle between successive escapement pins 72—72 of the escapement disk 73.

An escapement solenoid 76 fixedly mounted on the escapement mounting bracket 71 actuates a plunger 77, to which are connected an actuating arm 78 and a stop pawl 79. The plunger 77 is reciprocably movable in a bearing block 80, which is mounted on the escapement mounting bracket 71. A return spring 81 mounted in compression on the plunger 77 between a shoulder 85 thereon and the bearing block 80 presses the plunger 77 to its right-hand position, as shown in Fig. 11, when the solenoid 76 is not energized. A flat retaining spring 82 mounted at one end on the bearing block 80 presses at its opposite end against a pair of the actuating pins 75—75 of the actuating disk 74 to position the escapement disk 73, as shown in Fig. 11, with an escapement pin 72 projecting into an escapement slot 83 in the upwardly projecting guide portion 56 of the guide rail 50 and between the front and back feet 25—25 of a seal plate 21.

When the solenoid 76 is energized, the plunger 77 is moved to the left, causing the actuating arm 78 to press the adjacent actuating pin 75 in a counterclockwise direction by an angle equal to the angle between adjacent actuating pins 75—75, which is the same as the angle between adjacent escapement pins 72—72, thus rotating both the actuating disk 74 and the escapement disk 73 counterclockwise by one step to a position having exactly the same appearance as in Fig. 11, but in which each pin 72, 75 has moved counterclockwise to the former position of the pin 72, 75 ahead of it. When the solenoid is deenergized, the plunger 77 returns to its right-hand position shown in Fig. 11, ready to rotate the escapement disk and pins one step further when the solenoid 76 is next energized.

Each time the escapement mechanism 70 moves one step, the pin 72 that is projecting into the slot 83 and between the front and back feet 25—25 of a seal plate 21 propels the seal plate 21 downward from the holding position at 83, and the next escapement pin 72 moves between the front and back feet 25—25 of the next seal plate 21, moving it to, and holding it at, the holding position at 83 formerly occupied by the first seal plate 21. Normally the escapement solenoid 76 is energized and deenergized automatically, but a push button 84 is provided for occasional manual operation of the escapement mechanism 70 where desired.

*Guide chute 90*

An inclined guide chute 90 is fixedly mounted on an adapter plate 91 and a chute mounting block 92, which are fixedly connected to the table 64. Referring now to Figs. 12 and 13, the guide chute 90 includes a substantially flat bottom surface 93 and substantially flat opposite side surfaces 94—94. The upper end 95 of the guide chute 90 overlaps, and communicates with, the lower end 96 of the guide rail 50, so that each seal plate 21 propelled downward by the escapement mechanism 70 slides longitudinally from the guide rail 50 to the guide chute 90, sliding on the bottom surface 93 of the guide chute 90 to a stopping position 97 at the lower end of the guide chute 90.

A flat spring member 98 is mounted with its upper end 99 affixed to the guide chute 90 to provide a continuation of the bottom surface 93 of the chute 90. The lower end 100 of the spring member 98 comprises an upwardly projecting end portion 100 that causes the seal plate 21 that is propelled downward by the escapement mechanism 70 to come to rest at the stopping position 97. A thin flat-wire sensing contact 101 mounted in an insulating block 102 at the stopping position 97 yieldingly contacts any seal plate 21 present at the stopping position 97, completing a connection from the sensing contact 101 to the grounded guide chute 90, and thus providing sensing means for detecting the presence of any seal plate 21 at the stopping position 97.

*Injector 89*

An injector 89 includes a base 102 fixedly mounted on a staking frame 103, which is fixedly mounted on the table 64. Fixedly connected to, and projecting from, the base 102 are an actuating arm post 104, a stop post 105, and an injector arm guide post 106. A pivot bearing block 107 pivotably mounted on the actuating arm post 104 is fixedly connected to an actuating arm 108. One end 109 of the actuating arm 108 extends forward and slightly upward from the actuating arm post 104, and the other end 110 of the actuating arm 108 extends back and slightly downward from the actuating arm post 104. Mounted on the end 110 of the actuating arm 108 is an injector arm bearing 111.

Pivotably connected at the pivot 112 to the injector arm bearing 111 is one end of an injector arm 113, the other end of which comprises a hook-shaped member 114. An injector arm tension spring 115 is connected at one end to the hooked end 114 of the injector arm 113 and at the other end to a rod 116 that is connected to the injector arm bearing 111. A pawl 117 is yieldably connected to the lower end 114 of the injector arm 113 by means of a pawl spring 118 and associated pins 119—119.

The upper end 109 of the actuating arm 108 can be moved upward pivoting about the actuating arm post 104 and moving the lower end 110 forward and downward to a position at which the actuating arm 108 contacts the stop post 105. The injector arm 113 is thus pushed forward and downward as constrained by the injector arm guide post 106 and the injector arm spring 115. The pawl 117 at the lower end of the injector arm 113 thus is moved down into the guide chute 90 behind the seal plate 21 at the stopping position 97, and forward against the seal plate 21, propelling it from the stopping position 97 to an awaiting position 120, where it rests on a pair of receiver gates 121—121, as shown in Fig. 17.

Sealing assembly 122

A sealing assembly 122, shown in Figs. 6, 16, and 17, includes a lower staking base 123, fixedly mounted on the table 64; a sealing fixture 124, fixedly mounted on the staking base 123; a pair of upright supports 125—125, fixedly mounted on the staking base 123; a pair of plate receiver supports 126—126, fixedly connected to the sealing fixture 124; and a front stop plate 127, fixedly connected to the upright supports 125—125. The receiver gates 121—121 are pivotably mounted on respective gate pivot pins 128—128, which are connected to respective gate mounting members 130 of the sealing fixture 124. A resilient spring member 129 yieldably holds each gate 121 in the position shown in Fig. 17 for supporting a seal plate 21 in the awaiting position 120.

A lock-body-holder opening 131 in the sealing fixture 124 positions a lock body 22 in the receiving location 132 just below the awaiting position 120 of the seal plate 21, and supported by a loading support block 134. The front stop plate 127 is provided with a rectangular opening 133 extending from the top of the front stop plate 127 approximately three-fourths of the way down toward the bottom of the front stop plate 127, as shown in Fig. 6.

Staking punch 140

Referring now to Figs. 6, 18, and 19, a staking punch 140 comprises a staking plate mounting frame 141; front and rear staking plates 142—142, fixedly connected to the front and back, respectively, of the mounting frame 141; a locating pad 143; and a locating pad compression spring 144. The locating pad 143 includes a main body portion 145, front and rear guide projecting portions 146—146, and an upwardly projecting guide pin 147 fixedly connected to the upper end of the main body portion 145. The compression spring 144 is mounted around the guide pin 147, which extends into a cylindrical guide hole 148, between the shoulder surface 149 of the mounting frame 141 and the upper shoulder 150 of the locating pad 143. The spring 144 thus presses the locating pad downward, and normally retains it in the position shown in Figs. 18 and 19, with the lower surface 151 of the locating pad 143 extending below the lower ends of the staking plates 142—142 and with the projecting portions 146—146 at the lower end of guide slots 152—152 in the staking plates 142—142. An opening 153 in each staking plate 142 provides staking corners 154—154 for swaging or staking material that is forceably contacted thereby. The staking plates 142—142 are made of a hard material such as hardened steel.

Air motor 157

Connected to the upper end of the mounting frame 141 of the staking punch 140, as by the threaded connection indicated at 155 is the lower end 156 of an air cylinder or air motor 157, shown only in Fig. 6, which is fixedly mounted on the staking frame 103. The air motor 157 is connected through a control valve 158, tubing 159, a regulator and lubricator 160, and a cleaner 161, to a source of compressed air (not shown). The air motor 157 provides movement along a vertical line.

When the valve 158 is in the "down" position, the air motor 157 moves the staking punch 140 downward rapidly into the sealing assembly 122, causing the locating pad 143 to press the seal plate 21 through the yielding gates 121—121 onto the chamber block 30 of the lock body 22, and thrusting the staking plates 142—142 against the cylindrical casing 27 of the lock body 22 so that the staking corners 154—154 stake or swage the casing material 33—33 over the toes 26—26 of the seal plate 21, thus fastening it to the lock body 22, as shown in Fig. 3. When the valve 158 is in the "up" position, the air motor 157 moves the staking punch 140 back up to the position shown in Fig. 6. The downward movement of the air cylinder 157 and staking punch 140 is the power stroke, and the upward movement is the return stroke.

When the staking punch 140 is in its lower position, at the end of the power stroke, the lower shoulder 162 of the mounting frame 141 presses against the actuating arm 163 of a microswitch or lower limit switch 164, which is a single-pole double-throw switch, moving the switch contact arm 164 from a connection to a circuit including a "down" solenoid 165 for moving the valve 158 to the "down" position, to a connection in a circuit including an "up" solenoid 166 for moving the valve 158 to the "up" position.

When the staking punch 140 is in its upper position, at the end of the return stroke, as shown in Fig. 6, the upper surface 167 of the mounting frame 141 presses against the actuating arm 168 of microswitch or upper limit switch 169, which is a single-pole single-throw switch, moving it from its closed position in a circuit including the escapement solenoid 76, to its open position; and presses upward against the forward end 109 of the actuating arm 108 of the injector 89, causing it to propel a seal plate 21 from the stopping position 97 in the guide chute 90 to the awaiting position 120 in the sealing assembly 122.

Electrical control system 170

Fig. 4 shows schematically the electrical control system 170, many of the parts of which are shown also in Fig. 6. A power line or other A.C. voltage source 171 is connected through a double-pole single-throw main switch 172 and a fuse 173 to a pair of conductors 174, 175. The conductor 174 is connected to one terminal of the normally-closed upper limit switch 169 the other terminal of which is connected to a conductor 176. The conductor 176 is connected to one terminal of the escapement solenoid 76. The other terminal of the escapement solenoid 76 is connected to one terminal of the normally-closed push button switch 84, the other terminal of which is connected to the conductor 175. The conductor 176 is connected also to one terminal of a counter 177 the other terminal of which is connected to the conductor 175.

The conductor 174 is connected to one terminal of a normally-open foot switch 178 the other terminal of which is connected to a conductor 179. The conductor 179 is connected to one terminal of a relay 180, the other terminal of which is connected to the conductor 175. The conductor 179 is connected also to one end of the primary winding 181 of a step-down transformer 182; and the other end of the primary winding 181 is connected to the conductor 175. One end of the secondary winding 183 of the step-down transformer 182 is grounded as is indicated at 184; and the other end of the secondary winding 183 is connected to the contact arm of lower limit switch 164, a single-pole double-throw switch, which is normally in its upper position as shown in contact with the upper contact point 185 and away from the lower contact point 186 associated therewith.

Connected to the conductor 176 is a contact arm 187 of the relay 180 and its associated contact point 188 is connected to the conductor 179. The contact arm 189 of the relay 180 is connected by a conductor 191 to one terminal of the down solenoid 165, the other terminal of which is connected to the ground 184. The contact point 190 associated with the contact arm 189 is connected by a conductor 192 to the upper terminal 185 of the lower limit switch 164. When the relay 180 is not energized its contact arms 187, 189 remain in the upper positions shown in Fig. 4, with the contact arm 187 away from its associated contact point 188 and with the contact arm 189 in contact with its associated contact point 190. When the relay 180 is energized its contact arms 187, 189 are moved to their lower positions, with the contact arm 187 in contact with its associated contact point 188 and with the contact arm 189 away from its associated contact point 190.

The conductor 174 is connected to one end of the primary winding 193 of an isolation transformer 194; and the other end of the primary winding 193 is connected to the conductor 175. The secondary winding 195 of the transformer 194 supplies power to an amplifier 196 the output of which is connected to energize a sensing circuit relay 197. The sensing contact 101 is connected to a conventional or other convenient input circuit of the amplifier 196 so that when the contact 101 makes connection with the guide chute 90, by virtue of the presence of a seal plate 21 at the stopping position 97 therein, the input of the amplifier 196 is connected to the ground 184 and provides an output from the amplifier 196 that energizes the sensing circuit relay 197. When the sensing conductor 101 is not connected to the ground 184 the output of the amplifier 196 is zero and the sensing circuit relay 197 is not energized. A typical way to provide this type of action is to connect the sensing conductor 101 to the grid of an input tube that is biased beyond cut off, where the potential of the ground 184 is above cut off.

The sensing circuit relay 197 controls the contact arm 198 which remains in its upper position as shown in Fig. 4 away from its associated contact point 199 when the sensing circuit relay 197 is not energized, and moves to its lower position in contact with the contact point 199 when the relay 197 is energized. The contact arm 198 is connected by a conductor 200 to the lower contact point 186 of the lower limit switch 164. The contact point 199 is connected by a conductor 201 to one terminal of the up solenoid 166, the other terminal of which is connected to the ground 184.

The conductors 174, 175 are connected through a double-pole single-throw switch 202 and through a contact arm 203 and associated contact point 204 to the feed motor 49. The conductors 174, 175 are also connected across the primary winding 205 of an isolation transformer 206. The secondary winding 207 of the isolation transformer 206 supplies power to an upper detecting circuit oscillator-amplifier 208 and to a lower detecting circuit oscillator-amplifier 209. The oscillator-amplifiers 208, 209 preferably are alike, and each comprises a conventional or other convenient circuit in which the output of the amplifier is zero when the oscillator is in tune, and in which the amplifier provides a substantial output when the oscillator is out of tune, and thus not oscillating.

The upper detector circuit condenser 210 comprising the detector plate 66 and the guide rail 50, which is connected to the ground 184, has a capacitance such as to tune the oscillator portion of the oscillator amplifier 208 to resonance in the absence of a seal plate 21 in the vicinity of the detector plate 66. The presence of a seal plate 21 in the vicinity of the detector plate 66 increases the capacitance of the condensor 210 and thus detunes the oscillator portion of the oscillator-amplifier 208. Thus the presence of a seal plate 21 in the vicinity of the detector plate 66 provides an output in the oscillator-amplifier 208, while the absence of a seal plate 21 in the vicinity of the detector plate 66 provides zero output in the oscillator-amplifier 208.

The output of the oscillator amplifier 208 is connected to an upper detector circuit relay 211, which controls the position of a contact arm 212 having an associated contact point 213. When the output of the oscillator-amplifier 208 is zero, the upper detector circuit relay 211 is not energized and the contact arm 212 remains in its upper position, as shown in Fig. 4, away from its associated contact point 213. When an output is provided in the oscillator-amplifier 208, the upper detector circuit relay 211 is energized and the contact arm 212 moves to its lower position in contact with the contact point 213.

The condenser 214, comprising the lower detector plate 67 and the guide rail 50 which is connected to the ground 184, is connected in the oscillator circuit of the oscillator-amplifier 209 in the same manner as is the condenser 210 in the oscillator circuit of the oscillator-amplifier 208. Thus the effect of the presence or absence of a seal plate 21 in the vicinity of the lower detector plate 67 on the oscillator-amplifier 209 is the same as the effect of the presence or absence of a seal plate 21 in the vicinity of the upper detector plate 66 on the oscillator-amplifier 208. The presence of a seal plate 21 in the vicinity of the lower detector plate 67 detunes the oscillator and thus provides a substantial output in the oscillator-amplifier 209. The absence of a seal plate 21 in the vicinity of the lower detector plate 67 provides oscillation of the oscillator and thus provides zero output of the oscillator-amplifier 209.

A lower detector circuit relay 215 controls the position of the contact arm 203 and the position of a contact arm 216. When the lower detector circuit relay 215 is not energized, the contact arms 203, 216 remain in their upper positions as shown in Fig. 4, with the contact arm 203 in contact with the contact point 204 and with the contact arm 216 away from its associated contact point 217. When the lower detector circuit relay 215 is energized, the contact arms 203, 216 are moved to their lower positions, with the contact arm 203 away from its associated contact point 204 and with the contact arm 216 in contact with the contact point 217. The contact arm 216 is connected by a conductor 218 to the output of the oscillator-amplifier 209 and to the contact point 213 of the upper detector circuit relay 211. The contact point 217 is connected to one terminal of the lower detector circuit relay 215 and to the contact arm 212 of the upper detector circuit relay 211. The other terminal of the lower detector circuit relay 215 is connected to the ground 184.

To energize the lower detector circuit relay 215, it is necessary that an output be present in the oscillator-amplifier 209 and that the contact arm 212 be in contact with the contact point 213. The lower detector circuit relay 215 then remains energized as long as the oscillator-amplifier 209 continues to provide an output, since the energization of the relay 215 moves the contact arm 216 down into contact with the contact point 217 and thus connects the relay 215 to the output of the oscillator-amplifier 209 regardless of the position of the contact arm 212 of the upper detector circuit relay 211.

*Operation.—Supplying seal plates 21—21*

Referring now to Figs. 4 and 6, the removable cover 62 of the container 42 is removed, and a quantity of seal plates 21—21 is placed in the container 42 of the parts feeder 41. The cover 62 is then replaced in position on the fixed cover 61. The main switch 172 and the feed motor switch 202 are closed. The contact arm 203 is in its upper position, as shown in Fig. 4, in contact with the contact point 204. The feed motor 49 rotates the container 42 in a counterclockwise direction, causing the pockets formed by the cylindrical portion 43 and the longitudinal strips 46 to lift the seal plates 21—21 in the container 42 and drop them in the vicinity of the guide collector plates 53—53 (Fig. 5) which intercept some of the falling seal plates 21—21 and direct them toward the upper end 52 of the inclined guide rail 50.

The guide rail 50 catches some of the seal plates 21—21 that are longitudinally oriented substantially in the direction of the guide rail 50. These seal plates 21—21 slide down the guide rail 50 past the cutaway portion 57 to the inclined surfaces 58—58 which guide the channel members 21—21 to the supporting surfaces 55—55. The jam-preventer brushes 59—59 sweep away any seal plate 21 that is tipped or otherwise out of line or overlapping or riding on another seal plate 21. The seal plates 21—21 that are properly aligned pass beneath the jam-preventer brushes 59—59 and slide downward on the supporting surfaces 55—55 longitudinally in tandem out of the container 42 to the holding position 83.

When the upper end of the line of seal plates 21—21 reaches a position adjacent to the lower detector plate 67, the capacitance of the condenser 214 is increased, the oscillator-amplifier 209 is detuned, and an output is provided in the oscillator of the oscillator-amplifier 209. When the upper end of the line of seal plates 21—21 reaches a position adjacent to the upper detector plate 66, the capacitance of the condenser 210 is increased, the oscillator of the oscillator-amplifier 208 is detuned, and an output is provided in the oscillator-amplifier 208, energizing the upper detector circuit relay 211. The energization of the relay 211 moves the contact arm 212 down to its lower position in contact with the contact point 213, connecting the output of the oscillator-amplifier 209 to the lower detector circuit relay 215, and thus energizing the relay 215. The energization of the relay 215 moves the contact arms 203, 216 to their lower positions, with the contact arm 203 away from its associated contact point 204, disconnecting the circuit to the feed motor 49, and with the contact arm 216 in contact with its associated contact point 217, thus connecting the output of the oscillator-amplifier 209 to the lower detector circuit relay 215 regardless of the position of the contact arm 212 of the upper detector circuit relay 211.

When the upper end of the line of seal plates 21—21 moves down beyond the upper detector plate 66, the capacitance of the condenser 210 decreases back to its original capacitance at which the oscillator of the oscillator-amplifier 208 is tuned to resonance and cuts off the output of the oscillator-amplifier 208. Thus the upper detector circuit relay 211 is de-energized and the contact arm 212 moves to its upper position away from the associated contact point 213. This opens one connection between the oscillator-amplifier 209 and the lower detector circuit relay 215, but the output of the oscillator-amplifier 209 is still connected to the lower detector circuit relay 215 through the contact arm 216 and the contact point 217.

When the upper end of the line of seal plates 21—21 moves down past the lower detector plate 67, the capacitance of the condenser 214 is reduced to its original capacitance, which tunes the oscillator of the oscillator-amplifier 209 to resonance and thus cuts off the output of the oscillator-amplifier 209. The lower detector relay 215 is de-energized, and the contact arms 203, 216 return to their upper positions with the contact arm 203 in contact with the contact point 204 and with the contact arm 216 away from its associated contact point 217. Thus the feed motor 49 is once again connected to the power source 171, and rotates the container 42 to replenish the supply of seal plates 21—21 on the guide rail 50.

The operation of the feed motor 49 is automatically controlled in the manner described above, intermittently supplying seal plates 21—21 to the guide rail 50, and maintaining the upper end of the line of seal plates 21—21 approximately between the lower detector plate 67 and the upper detector plate 66.

*Intermediate operations*

To initiate the further feeding and sealing operations when the sealing machine 40 is put into operation for the first time, the push button switch 84 of the escapement mechanism 70 is pushed and released, momentarily de-energizing the escapement solenoid 76 and permitting the return spring 81 to move the plunger 77 to its right-hand position away from the actuating disk 74, and then re-energizing the escapement solenoid 76 to move the plunger 77 to its left-hand position with the actuating arm 78 driving the adjacent actuating pin 75 one step counterclockwise. Thus the escapement disk 73 is also moved one step counterclockwise, and the lowest seal plate 21, the lower end of which rests against the escapement pin 72 projecting into the escapement slot 83, is engaged by the next escapement pin 72 between the front and back feet 25—25 of the seal plate 21. The lowest seal plate 21 is now in the normal holding position 83.

The push button 84 is pushed and released a second time, causing the solenoid 76 to drive the escapement disk another step in the counterclockwise direction, propelling the lowest seal plate 21 from the holding position 83 to the stopping position 97 in the guide chute 90 and moving the next escapement pin 72 between the front and back feet 25—25 of the next seal plate 21, moving it to the holding position 83.

The seal plate 21 in the stopping position 97 contacts the sensing contact 101 and thus grounds the input of the amplifier 196 through the guide chute 90. This is a low-voltage, low-current circuit, and even if the seal plate 21 is dirty or oily, the resulting high-resistance contact still is sufficient to raise the amplifier input above cutoff and provide an output in the amplifier 196 to energize the sensing circuit relay 197. With the relay 197 energized, the contact arm 198 is moved to its lower position in contact with the contact point 199.

With the air motor 157 in its lower position, the lower limit switch arm 164 is in its lower position in contact with the contact point 186. Thus the circuit is completed from the secondary 183 of the stepdown transformer 182 through the contact arm 164, the contact point 186, the conductor 200, the contact arm 198, the contact point 199, and the conductor 201 to the up solenoid 166. This circuit is broken whenever the sensing circuit relay 197 is not energized. Thus, the up solenoid 166 cannot be energized unless a seal plate 21 is present in the stopping position 97 of the guide chute 90.

The foot switch 78 is closed momentarily, energizing the relay 180 and energizing the up solenoid 166 through the stepdown transformer 182. The up solenoid 166 moves the valve 158 to its up position, causing the compressed air from the line 159 to move the air cylinder 157 upward.

The energization of the relay 180 moves the contact arms 187, 189 to their lower positions, with the contact arm 187 in contact with the contact point 188, and with the contact arm 189 away from its associated contact point 190. The relay 180 remains energized after the foot switch 178 is released, as the connection from the conductor 174 is completed through the upper limit switch 169, the conductor 176, the contact arm 187, the contact point 188, and the conductor 179. When the air motor 157 and the staking punch 140 move away from their lower position, the lower limit switch arm 164 moves to its upper position, as shown in Fig. 4, in contact with the upper contact point 185, which is connected in the circuit to the down relay 165. The connection to the down relay 165 is broken, however, since the contact arm 189 is in its lower position away from its associated contact point 190.

When the air motor 157 reaches its upper position, as shown in Fig. 6, at the end of the up stroke or return stroke, the upper surface 167 of the staking plate mounting frame 141 presses against the actuating arm 168 of the microswitch or upper limit switch 169, opening the upper limit switch 169, and deenergizing the escapement solenoid 76 and the relay 180. The contact arms 187, 189 return to their upper positions, as shown in Fig. 4. At the end of the up stroke of the air motor 157, the upper surface 167 of the staking plate mounting frame 141 presses upward also against the forward end 109 of the actuating arm 108 of the injector 89, causing it to propel the seal plate 21 from the stopping position 97 in the guide chute 90 to the awaiting position 120 in the sealing assembly 122. The sealing machine 40 is now ready for automatic or semiautomatic operation, as desired. The details of the starting procedure described above may be varied, as by manually placing seal plates 21—21 in the necessary positions for beginning the normal operating cycle.

*Normal operating cycle*

The normal operating cycle begins with the air motor 157 in its upper position, as shown in Fig. 6, either automatically by causing the switch 178 to close at this position of the air motor 157, or by manually closing the switch 178 momentarily, as desired. The closing of the switch 178 completes the connection from the conductor 174 through the conductor 179 to the primary winding 181 of the step down transformer 182, thus energizing the down solenoid 165 from the secondary winding 183 of the step down transformer 182 through the contact arm 164, the contact point 185, the conductor 192, the contact point 190, the contact arm 189, and the conductor 191.

The down solenoid 165 moves the valve 158 to its down position, causing the air motor 157 to move downward, driving the staking punch 140 down in a power stroke. As the air motor 157 moves downward, away from its upper position, the upper limit switch 169 closes, energizing the counter 177, causing it to move one step to record the operation; and energizing the escapement solenoid 76, which propels another seal plate 21 to the stopping position 97 in the guide chute 90 to replace the seal plate 21 that was propelled by the injector 89 to the awaiting position 132 in the sealing assembly 122.

The momentary closing of the switch 178 also energizes the relay 180, which is then locked in through the upper limit switch 169, the conductor 176, the contact arm 187, the contact point 188, and the conductor 179, the contact arm 187 being moved down into contact with the contact point 188 by the energization of the relay 180. The energization of the relay 180 also moves the contact arm 189 to its lower position away from its associated contact point 190, thus opening the connection to the down solenoid 165, but the relay 180 has a delay of approximately 1/10 of a second to permit the fast-acting down solenoid 165 to move the valve 158 to its down position before the circuit is broken by the contact arm 189.

The air motor 157 drives the staking punch 140 downward rapidly into the sealing assembly 122, causing the locating pad 143 to thrust the seal plate 21 through the yielding gates 121—121 onto the chamber block 30 of the lock body 22, and thrusting the staking plates 142—142 against the cylindrical housing 27 of the lock body 22. The staking corners 154—154 stake or swage the housing material 33—33 over the toes 26—26 of the seal plate 21, fastening the seal plate 21 to the lock body 22, as in Fig. 3.

When the staking punch 140 reaches its lower position, at the end of the power stroke, the lower shoulder 162 of the mounting frame 141 presses against the actuating arm 163 of the microswitch or lower limit switch 164, moving the switch contact arm 164 from its upper position as shown in Fig. 4 to its lower position in contact with the contact point 186. Provided that a seal plate 21 is present in the stopping position 97 of the guide chute 90, which is the condition necessary to energize the sensing circuit relay 197 and thus move the contact arm 198 to its lower position in contact with the contact point 199, the up solenoid 166 is then energized. The connection from the conductor 174 is completed through the upper limit switch 169, the conductor 176, the contact arm 187, the contact point 188, and the conductor 179 to the primary winding 181 of the step-down transformer 182, and the connection is completed from the secondary winding 183 of the step-down transformer 182 through the switch contact arm 164, the contact point 186, the conductor 200, the contact arm 198, the contact point 199, and the conductor 201, to the up solenoid 166. The energization of the up solenoid 166 moves the valve 158 to its up position, moving the air motor 157 and the staking punch 140 upward in the return stroke.

When the air motor 157 and the staking punch 140 move away from their lower position, the lower limit switch arm 164 moves to its upper position, as shown in Fig. 4, in contact with the upper contact point 185, which is connected in the circuit to the down relay 165. The connection to the down relay 165 is broken, however, since the contact arm 189 is in its lower position away from its associated contact point 190.

When the air motor 157 reaches its upper position, as shown in Fig. 6, at the end of the up stroke or return stroke, the upper surface 167 of the staking plate mounting frame 141 presses against the actuating arm 168 of the microswitch or upper limit switch 169, opening the upper limit switch 169, and deenergizing the escapement solenoid 76 and the relay 180. The contact arms 187, 189 return to their upper positions, as shown in Fig. 4. At the end of the up stroke of the air motor 157, the upper surface 167 of the staking plate mounting frame 141 presses upward also against the forward end 109 of the actuating arm 108 of the injector 89, causing it to propel the seal plates 21 from the stopping position 97 in the guide chute 90 to the awaiting position 120 in the sealing assembly 122.

With the air motor 157 and the staking punch 140 once again in their upper positions at the end of the return stroke, the operation is repeated, beginning with the manual or automatic momentary closing of the switch 178, as desired; and so on for any desired number of cycles of operation.

For simplicity, the sealing machine 40 is disclosed herein as a separate unit, but it can easily be adapted to serve as part of a completely automatic lock-assembling machine by combining it with the assembly apparatus of the co-pending U.S. Patent application of Gerald A. Francis et al., Serial No. 555,047, filed December 23, 1955. The appropriate interlock switches of the Francis et al. assembly apparatus can be connected in series with the switch 178 between the conductor 174 and the conductor 179, and the sealing assembly 122 can be slightly modified in an obvious manner, such that the receiving location 132 becomes one of the stations on the turntable 55 shown in Fig. 4 of the Francis et al. patent application.

In the sealing machine 40 as shown in the drawings, the operation is interrupted at the end of the down stroke if there is no seal plate 21 in the stopping position 97 of the guide chute 90. Usually after inspection for possible trouble, the condition is remedied by pushing and releasing the push button 84, thus deenergizing and then energizing the escapement solenoid 76 and causing it to propel a seal plate 21 to the stopping position 97. If the preliminary inspection is not desired, this operation can be made automatic by substituting a relay-actuated switch for the push button switch 84. Other obvious variations may of course be made where desired.

The sealing machine 40 provides an unexpected advantage over manual operation. The locating pad 143, by virtue of its rapid operation, can press the seal plate 21 into position on the lock body 22, even where burrs are present on the chamber block 30 or in the slot 32 of the lock body 22 that would prevent the manual insertion of the seal plates 21 into the proper position. The rapid motion provided by the locating pad 143 causes the seal plate 21 to remove or cut through any burrs that may be present.

*Summary*

To summarize, apparatus 40 for feeding singly to a predetermined receiving location 132 a plurality of substantially identical channel members 21—21 and for fastening each channel member 21 to a receiving member 22 at least partially surrounding the channel member 21 at the receiving location 132 comprises: a container 42 for the channel members 21—21; means 43, 46 for lifting and dropping the channel members 21—21 in the container 42; means 53—53 for intercepting some of the falling channel members and directing them toward a predetermined location 52; an inclined guide rail 50 having its upper end 52 at the predetermined location 52 for catching some of the channel members 21—21 dropping thereon that are longitudinally oriented substantially in the direction of the rail 50 and for permitting the channel members 21—21 to slide longitudinally in tandem down the guide rail 50 and out of the container 42; means 59—59, 60 in the container 42 adjacent to the guide rail 50 for removing from the rail 50 any channel member 21 thereon that extends beyond a predetermined region; upper and lower detecting means 66, 67 adjacent to the guide rail 50 at upper and lower detecting positions 66, 67, respectively, on the rail 50, for detecting the presence of any channel member 21 at each detecting position; means 211, 215, 49, etc. responsive to the detecting means 66, 67, for starting the operation of the lifting and dropping means 43, 46 in the absence of any channel member 21 at the lower detecting position 67, for continuing the operation of the lifting and dropping means 43, 46 in the absence of any channel member 21 at the upper detecting position 66, and for stopping the operation of the lifting and dropping means 43, 46 upon the presence of a channel member 21 at the upper detecting position 66; an escapement mechanism 70, at a holding location 83 on the rail 50 below the detecting positions 66, 67, for releasing and propelling one channel member 21 at a time, comprising a rotatable member 73 having radially projecting pins 72—72 angularly equally spaced thereon and means 74, 75, 76, 77, 78 for rotating the rotatable member 73 at a predetermined stage of operation through an angle equal to the angle between successive projecting pins 72—72 to move one projecting pin 72 from the holding location 83 and propel one channel member 21 downward from the holding location 83 while moving the next projecting pin 72 to the holding location 83 to retain the next channel member 21 at the holding location 83; an inclined guide chute 90, having its upper end 95 communicating with the lower end 96 of the guide rail 50, for receiving each channel member 21 propelled downward by the escapement mechanism 70 and for permitting the channel member 21 to slide longitudinally down on the bottom surface 93 of the chute 90 to a stopping position 97 therein including a surface 100 projecting above the adjacent bottom surface 93; sensing means 101 at the stopping position 97 for detecting the presence of any channel member 21 at the stopping position 97; means 124, 131, 134 for positioning a receiving member 22 in place at the receiving location 132; yieldable means 121, 128, 129 for supporting a channel member 21 at an awaiting position 120 adjacent to the receiving location 132; reciprocable pressing and fastening means 140 comprising a yieldable pressing member 143 positioned to press the channel member 21 from the awaiting position 120 to the receiving location 132 during a power stroke (down stroke) of the pressing and fastening means 140, and a fastening member 142—142 positioned to strike the receiving member 22 at the end of the power stroke to swage a portion of the receiving member 22 adjacent to the channel member 21 to fasten the channel member 21 to the receiving member 22; reciprocable drive means 157 for driving the pressing and fastening means 140 alternately in a power stroke from a return position (upper position, as in Fig. 6) spaced from the receiving position 132 to a fastening position (at lower end of down stroke) in contact with the receiving member 22, and in a return stroke from the fastening position to the return position; means 196, 197, 198, responsive to the sensing means 101, for interrupting the drive means 157 before its return stroke in the absence of any channel member 21 at the stopping position 97 and for providing the return stroke upon the presence of a channel member 21 at the stopping position 97; and means 89, responsive to the position of the pressing and fastening means 140, for propelling the channel member 21, during the return stroke, from the stopping position 97 to the awaiting position 120, ready to be pressed to the receiving location 132 and fastened to the receiving member 22 by the next power stroke of the pressing and fastening means 140.

The reference characters in the above summary indicate generally the primary components shown in the drawings corresponding to the recited features, to facilitate understanding of the claims. The reference characters are used merely by way of example, however, and not in any limiting sense.

While the form of the invention herein disclosed constitutes a preferred embodiment, it is not intended to describe all of the possible equivalent forms or ramifications of the invention. It will be understood that the words used are words of description rather than of limitation, and that various changes, as in shape, relative size, and arrangement of parts, may be made without departing from the spirit or scope of the invention herein disclosed.

What is claimed is:

1. Apparatus for feeding singly to a predetermined receiving location a plurality of substantially identical channel members and for fastening each said channel member to a receiving member at least partially surrounding said channel member at said receiving location, comprising: a container for said channel members; means for lifting and dropping said channel members in said container; means for intercepting some of the falling channel members and directing them toward a predetermined location; an inclined guide rail having its upper end at said predetermined location for catching some of the channel members dropping thereon that are longitudinally oriented substantially in the direction of said rail and for permitting said channel members to slide longitudinally in tandem down said guide rail and out of said container; an escapement mechanism, at a holding location on said rail below said detecting positions, for releasing and propelling one said channel member at a time, comprising a rotatable member having radially projecting pins angularly equally spaced thereon and means for rotating said rotatable member at a predetermined stage of operation through an angle equal to the angle between successive projecting pins to move one said projecting pin from said holding location and propel one said channel member downward from said holding location while moving the next said projecting pin to said holding location to retain the next said channel member at said holding location; an inclined guide chute, having its upper end communicating with the lower end of said guide rail, for receiving each said channel member propelled downward by said escapement mechanism and for permitting said channel member to slide longitudinally down on the bottom surface of said chute to a stopping position therein including a surface projecting above the adjacent bottom surface; yieldable means for supporting a channel member at an awaiting position adjacent to said receiving location; reciprocable pressing and fastening means comprising a yieldable pressing member positioned to press said channel member from said awaiting position to said receiving location during a power stroke of said pressing and fastening means, and a fastening member positioned to strike said receiving member at the end of said power stroke to swage a portion of said receiving member adjacent to said channel member to fasten said channel member to said receiving member; reciprocable drive means for driving said pressing and fastening means alternately in a power stroke from a return position spaced from said receiving position to a fastening position in contact with said receiving member, and in a return stroke from said fastening position to said return position; and means, responsive to the position of said pressing and fastening means, for propelling said channel member, during said return stroke, from said stopping position to said awaiting position, ready to be pressed to said receiving location and fastened to said receiving member by the next power stroke of said pressing and fastening means.

2. Apparatus according to claim 1, including upper and lower detecting means adjacent to said guide rail at upper and lower detecting positions, respectively, on said rail, for detecting the presence of any channel member at each said detecting position and means, responsive to said detecting means, for starting the operation of said lifting and dropping means in the absence of any channel member at said lower detecting position, for continuing the operation of said lifting and dropping means in the absence of any channel member at said upper detecting position, and for stopping the operation of said lifting and dropping means upon the presence of a channel member at said upper detecting position.

3. Apparatus according to claim 1, including sensing means at said stopping position for detecting the presence of any channel member at said stopping position, and means, responsive to said sensing means, for interrupting the reciprocal movement of said drive means before its return stroke in the absence of any channel member at said stopping position and for providing said return stroke upon the presence of a channel member at said stopping position.

4. Apparatus for feeding singly to a predetermined receiving location a plurality of substantially identical channel members and for fastening each said channel member to a receiving member at least partially surrounding said channel member at said receiving location, comprising: a container for said channel members; means for lifting and dropping said channel members in said container; means for intercepting some of the falling channel members and directing them toward a predetermined location; an inclined guide rail having its upper end at said predetermined location for catching some of the channel members dropping thereon that are longitudinally oriented substantially in the direction of said rail and for permitting said channel members to slide longitudinally in tandem down said guide rail and out of said container; means in said container adjacent to said guide rail for removing from said rail any member thereon that extends beyond a predetermined region; upper and lower detecting means adjacent to said guide rail at upper and lower detecting positions, respectively, on said rail, for detecting the presence of any channel member at each said detecting position; means, responsive to said detecting means, for starting the operation of said lifting and dropping means in the absence of any channel member at said lower detecting position, for continuing the operation of said lifting and dropping means in the absence of any channel member at said upper detecting position, and for stopping the operation of said lifting and dropping means upon the presence of a channel member at said upper detecting position; an escapement mechanism, at a holding location on said rail below said detecting positions, for releasing and propelling one said channel member at a time, comprising a rotatable member having radially projecting pins angularly equally spaced thereon and means for rotating said rotatable member at a predetermined stage of operation through an angle equal to the angle between successive projecting pins to move one said projecting pin from said holding location and propel one said channel member downward from said holding location while moving the next said projecting pin to said holding location to retain the next said channel member at said holding location; an inclined guide chute, having its upper end communicating with the lower end of said guide rail, for receiving each said channel member propelled downward by said escapement mechanism and for permitting said channel member to slide longitudinally down on the bottom surface of said chute to a stopping position therein including a surface projecting above the adjacent bottom surface; sensing means at said stopping position for detecting the presence of any channel member at said stopping position; means for positioning a receiving member in place at said receiving location; yieldable means for supporting a channel member at an awaiting position adjacent to said receiving location; reciprocable pressing and fastening means comprising a yieldable pressing member positioned to press said channel member from said awaiting position to said receiving location during a power stroke of said pressing and fastening means, and a fastening member positioned to strike said receiving member at the end of said power stroke to swage a portion of said receiving member adjacent to said channel member to fasten said channel member to said receiving member; reciprocable drive means for driving said pressing and fastening means alternately in a power stroke from a return position spaced from said receiving position to a fastening position in contact with said receiving member, and in a return stroke from said fastening position to said return position; means, responsive to said sensing means, for interrupting the reciprocal movement of said drive means before its return stroke in the absence of any channel member at said stopping position and for providing said return stroke upon the presence of a channel member at said stopping position; and means, responsive to the position of said pressing and fastening means, for propelling said channel member, during said return stroke, from said stopping position to said awaiting position, ready to be pressed to said receiving location and fastened to said receiving member by the next power stroke of said pressing and fastening means.

5. Apparatus for feeding singly to a predetermined receiving location a plurality of substantially identical channel members and for fastening each said channel member to a receiving member at least partially surrounding said channel member at said receiving location, comprising: guide means for conveying said channel members longitudinally in tandem to a holding location; means for feeding said channel members to said guide means; escapement means at said holding location for releasing and propelling one said channel member at a time at controlled times from said holding location to a stopping position while retaining the next said channel member at said holding location; means for propelling said channel member at controlled times from said stopping position to an awaiting position adjacent to said receiving location; and means for moving said channel member from said awaiting position to said receiving location and swaging a portion of said receiving member adjacent to said channel member to fasten said channel member to said receiving member.

6. Apparatus according to claim 5, including detecting means adjacent to said guide means for detecting the presence of any channel member adjacent to said detecting means, and means, responsive to said detecting means, for maintaining the number of said channel members on said guide means within predetermined approximate upper and lower limits.

7. Apparatus according to claim 5, including sensing means at said stopping position for detecting the presence of any channel member at said stopping position, and means, responsive to said sensing means, for interrupting the operation of said moving and swaging means in the absence of any channel member at said stopping position and for permitting the operation of said moving and swaging means upon the presence of a channel member at said stopping position.

8. Apparatus for feeding singly to a predetermined receiving location a plurality of substantially identical channel members and for fastening each said channel member to a receiving member at least partially surrounding said channel member at said receiving location, comprising: guide means for conveying said channel members longitudinally in tandem to a holding location; means for feeding said channel members to said guide means; detecting means adjacent to said guide means for detecting the presence of any channel member adjacent to said detecting means; means, responsive to said detecting means, for maintaining the number of said channel members on said guide means within predetermined approximate upper and lower limits; escapement means at said holding location for releasing and propelling one said channel member at a time at controlled times from said holding location to a stopping position while retaining the next said channel member at said holding location; sensing means at said stopping position for detecting the presence of any seal plate at said stopping position; means for propelling said channel member at controlled times from said stopping position to an awaiting position adjacent to said receiving location; means for moving said channel member from said awaiting position to said receiving position and swaging a portion of said receiving member adjacent to said channel member to fasten said channel member to said receiving member; and means, responsive to said sensing means for interrupting the operation of said moving and swaging means in the absence of any channel member at said stopping position and for permitting the operation of said moving and swaging means upon the presence of a channel member at said stopping position.

9. Apparatus for feeding singly to a predetermined receiving location a plurality of substantially identical channel members and for fastening each said channel member to a receiving member at least partially surrounding said channel member at said receiving location, comprising: guide means for conveying said channel members longitudinally in tandem to a holding location; means for feeding said channel members to said guide means; means for maintaining the number of said channel members on said guide means within predetermined approximate upper and lower limits; escapement means at said holding location for releasing and propelling one said channel member at a time at controlled times from said holding location to a stopping position while retaining the next said channel member at said holding location; means for propelling said channel member at controlled times from said stopping position to an awaiting position adjacent to said receiving location; means for moving said channel member from said awaiting position to said receiving location and swaging a portion of said receiving member adjacent to said channel member to fasten said channel member to said receiving member; and means for interrupting the operation of said moving and swaging means in the absence of any channel member at said stopping position and for permitting the operation of said moving and swaging means upon the presence of a channel member at said stopping position.

10. Apparatus for feeding singly to a predetermined receiving location a plurality of substantially identical channel members and for fastening each said channel member to a receiving member at least partially surrounding said channel member at said receiving location, comprising: means for supplying said channel members to a holding location; escapement means at said holding location for releasing and propelling one said channel member at a time at controlled times from said holding location to a stopping position while retaining the next said channel member at said holding location; means for propelling said channel member at controlled times from said stopping position to an awaiting position adjacent to said receiving location; and means for moving said channel member from said awaiting position to said receiving location and swaging a portion of said receiving member adjacent to said channel member to fasten said channel member to said receiving member.

11. Apparatus according to claim 10, including means for interrupting the operation of said moving and swaging means in the absence of any channel member at said stopping position, and for permitting the operation of said moving and swaging means upon the presence of a channel member at said stopping position.

12. Apparatus for feeding singly to a predetermined receiving location a plurality of substantially identical channel-shaped seal plates and for fastening each said seal plate to a lock body at least partially surrounding said seal plate at said receiving location, comprising: a container for said seal plates; means for lifting and dropping said seal plate in said container; means for intercepting some of the falling seal plates and directing them toward a predetermined location; an inclined guide rail having its upper end at said predetermined location for catching some of the seal plates dropping thereon that are longitudinally oriented substantially in the direction of said rail and for permitting said seal plates to slide longitudinally in tandem down said guide rail, supported by their feet on said guide rail, and out of said container; means in said container adjacent to said guide rail for removing from said rail any seal plate thereon that extends beyond a predetermined region; upper and lower capacitive detecting means adjacent to said guide rail at upper and lower detecting positions, respectively, on said rail, for detecting the presence of any seal plate at each said detecting position; switching means, responsive to said detecting means, for starting the operation of said lifting and dropping means in the absence of any seal plate at said lower detecting position, for continuing the operation of said lifting and dropping means in the absence of any seal plate at said upper detecting position, and for stopping the operation of said lifting and dropping means upon the presence of a seal plate at said upper detecting position; an escapement mechanism, at a holding location on said rail below said detecting positions, for releasing and propelling one said seal plate at a time, comprising a rotatable member having radially projecting pins angularly equally spaced thereon and solenoid-actuated drive means for rotating said rotatable member at a predetermined stage of operation in response to automatic switching means, through an angle equal to the angle between successive projecting pins to move one said projecting pin from said holding location and propel one said seal plate downward from said holding location while moving the next said projecting pin to said holding location to retain the next said seal plate at said holding location; an inclined guide chute, having its upper end communicating with the lower end of said guide rail, for receiving each said seal plate propelled downward by said escapement mechanism and for permitting said seal plate to slide longitudinally down on the bottom surface of said chute to a stopping position therein including a surface projecting above the adjacent bottom surface; a sensing contact at said stopping position for detecting the presence of any seal plate at said stopping position; means for positioning a lock body in place at said receiving location; yieldable gates for supporting a seal plate at an awaiting position adjacent to said receiving location; a reciprocable staking punch comprising a yieldable locating pad positioned to thrust said seal plate from said awaiting position cutting through any burrs that may be present on said lock body and pressing said seal plate onto a chamber block in said lock body at said receiving location, during a power stroke of said staking punch, and staking plates positioned to strike said lock body at the end of said power stroke to swage portions of said lock body adjacent to said seal plate to fasten said seal plate to said lock body; reciprocable drive means for driving said staking punch alternately in a power stroke from a return position spaced from said receiving position to a fastening position in contact with said lock body, and in a return stroke from said fastening position to said return position; switching means, operatively associated with said sensing contact, for interrupting the reciprocal movement of said drive means before its return stroke in the absence of any seal plate at said stopping position and for providing said return stroke upon the presence of a seal plate at said stopping position; and an injector, actuated by said staking punch, for propelling said seal plate, during said return stroke, from said stopping position to said awaiting position, ready to be pressed to said receiving location and fastened to said lock body by the next power stroke of said staking punch.

References Cited in the file of this patent

UNITED STATES PATENTS

| | | |
|---|---|---|
| 161,240 | Kingman | Mar. 23, 1875 |
| 445,964 | Morrison | Feb. 3, 1891 |
| 946,584 | Smith | Jan. 18, 1910 |
| 1,493,103 | Carlson | May 6, 1924 |
| 1,520,013 | Culotta | Dec. 23, 1924 |
| 1,692,456 | Lynch et al. | Nov. 20, 1928 |
| 1,839,048 | Phelps et al. | Dec. 29, 1931 |
| 2,052,356 | Long | Aug. 25, 1936 |
| 2,157,709 | Kiessling et al. | May 9, 1939 |
| 2,531,099 | Anderson | Nov. 21, 1950 |

FOREIGN PATENTS

| | | |
|---|---|---|
| 163,175 | Australia | June 2, 1955 |